Aug. 2, 1960
J. C. J. FINCK
2,947,799
WATER-TIGHT CASE FOR ELECTRICAL APPARATUS
Filed May 9, 1956
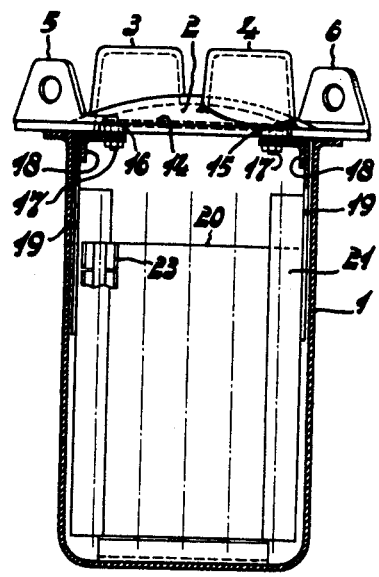
Fig. 1.
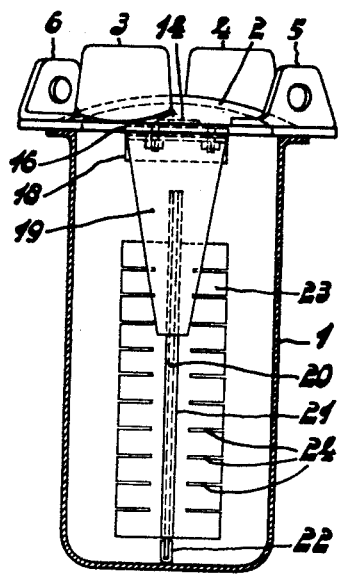
Fig. 2.
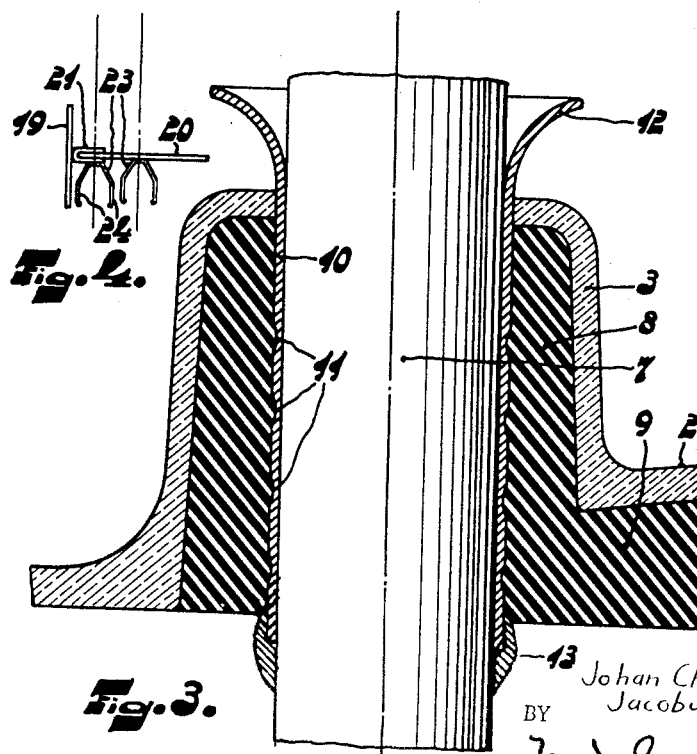
Fig. 4.
Fig. 3.
INVENTOR.
Johan Christiaan-
Jacobus Finck
BY Fred M. Vogel
Agent

United States Patent Office 2,947,799
Patented Aug. 2, 1960

2,947,799

WATER-TIGHT CASE FOR ELECTRICAL APPARATUS

Johan Christiaan Jacobus Finck, Hilversum, Netherlands, assignor, by mesne assignments, to North American Philips Company, Inc., New York, N.Y., a corporation of Delaware Filed May 9, 1956, Ser. No. 583,753

6 Claims. (Cl. 174—50.62)

The present invention relates to a watertight case, especially to a loading coil case. More particularly, the invention relates to a loading coil case for a substantially flexible cable.

In conventional constructions, loading-coil cases for telephone connections comprise a receptacle and a cover made from iron or steel, which fit together to permit a water-tight closure.

The cover is provided with openings in which copper bushings are arranged. Steel rings are soldered around the bushings and are welded to the cover cables which are introduced through the copper bushings. A part of the lead covering of the cable, the copper bushing and the steel ring are jointly covered with a layer of metal solder to prevent moisture from entering through the cover.

With a view to securing perfect obturation against fluids it has furthermore been proposed to make loading-coil cases from ceramic material, the closure being effected by soldering a metal intermediate plate or a ceramic cover with a metallized edge to the metallized edge of the receptacle.

Apart from the question of whether this can be reduced to practice and whether it is a reliable means for preventing penetration of moisture, such cases have the disadvantage of being very fragile. Therefore, ceramic cases preferably had a base of wood or similar material, in order to prevent breakage in shipment and when in position. For this and other reasons, ceramic cases are unsuitable for a lengthy underground position.

The present invention concerns a case made from a material which fulfils the conditions not satisfied by hitherto used or proposed materials. Such material may comprise thermo-setting plastic comprising insulating reinforcing means. For this purpose, polyester resin is eminently suitable. This is a known material, from which all kinds of articles can be made, but which has particular advantages for the purpose for which it is employed in accordance with the invention. The reinforcing means usually consist of Fiberglas or glass tissue.

The cases in accordance with the invention can be pressed from polyester resin material in a known manner. Alternatively, the cases may be moulded of cold-setting synthetic resin such as, for example, ethoxyline resin which may likewise be reinforced with glass, for example glass cloth.

Loading coil cases are practically always arranged in a moist atmosphere, usually underground, so that they must primarily withstand pentration of water and other fluids such as, for example, oil. Polyester resin is perfectly resistant to moisture and fluids. The cover may be secured to the case in a moisture-tight manner. A suitable method consists in affixing the cover by means of ethoxyline resin to the edge of the case. Ethoxyline resin, which is sold under various names and trademarks, such as, for example, "Araldite," adheres firmly to other plastics, particularly polyester resins, and permits the cover to be rigidly secured to the receptacle without the need for other fastening means such as screws or clamps.

The main reason for using reinforced plastic instead of iron or steel is that plastic is an excellent insulator. Of course, in mounting steel cases, care is to be exercised that the cable conductors should not electrically contact the wall either directly or via mounting parts. After the mounting operation, the insulation has to be tested. For this purpose, a test voltage, for example of 2000 volts, is applied between the case and all the conductors of the cables jointly. The test voltage considerably exceeds the voltage with which the conductors are loaded during normal operation. If the insulation is found to be incapable of withstanding the test voltage, the conductors have to be connected one by one to said test voltage. This time-consuming test can be completely dispensed with when the case is made of electrically insulating material.

A further advantage of the case of the present invention is that it does not corrode, in contradistinction to metal cases, particularly steel cases. Hence, cable trouble due to corrosion no longer occurs and neither corrosion control nor the use of anti-corrosion means are necessary.

The fact that the wall of the case is electrically insulating is of particular importance when the case is positioned underground, since then the cable is protected against lightning and other electrical influences which may cause considerable potential shifts in the earth surface. Such potential shifts may result in a high electric potential being set up between the wall of a steel case and the cable conductors, which may give rise to breakdown and damage.

With the case of the present invention, a high case to cable potential does not cause breakdown as readily as with metal cases, since a solid, insulating intermediate layer is present in the break-down path. The space surrounding the conductors and the coils in steel cases is potted with insulating material, but the potential shift is then communicated not only to the wall but also to the frame to which the conductors and coils are secured with a comparatively weak insulation. When the cases of the present invention are used, the potting with insulating material may be dispensed with.

Since stray current in the earth need not be feared, the cases of the present invention may be arranged with impunity in the proximity of high-tension cables or electric railways. Metal cases should not be so positioned.

The case of the present invention has the advantage of lower weight over both the conventional cases made from metal and the proposed case of ceramic material. This yields a considerable economy in view of long-distance transport. The case of the present invention is also more economical in cost of material and manufacture than other types of case.

Although only loading coil cases have so far been referred to, the aforesaid advantages are not exclusively limited to cases of this type. The invention generally includes waterproof casings for enclosing electrical devices such as, for example, inductors, transformers, capacitors, resistors, junction terminals and other types of devices which need no supervision. The use of the invention as a loading coil case is, however, to be regarded as one of the most important.

The conventional way of passing cables through the cover is not feasible if said cover is made of plastic. It is, however, difficult to reliably secure a steel cover to a plastic receptacle in a water-tight manner. In one case, made in accordance with the further embodiment of the invention which yields an excellent solution of said problem, a cable is introduced through a projecting portion of the cover and the space between the cable and the inner wall of the projection is filled with an insulating medium, such as ethoxyline resin which firmly adheres both to the plastic cover and to the metal of the cable. The use of the singular form is not intended to restrict the invention, and includes the attachment of two or more cables to the case in the aforesaid manner.

If, in the case of the present invention, moisture passes through the seam between the cable sleeve and the inner edge of the hole in the cover, it is prevented from penetrating further into the case, since the filling material engages the inner wall of the projecting part and the cable sleeve to such an extent as to prevent penetration of moisture.

Since underground cases are usually pressure loaded in testing, for example subjected to a pressure of 1.4 kilograms per square centimeter, it is advantageous to dish the cover and fill the dished portion with ethoxyline resin or similar cold-setting material. This is only increases its resistance to pressure, but affords an additional advantage. Supports may be embedded in the potting material and used for the attachment of inner parts, such as coils and capacitors, of the case. These parts may be suspended from the cover on arranging it on the case.

The lead sleeve of a telephone cable is usually given a fixed potential and sometimes it is surrounded by an insulating layer, for example rubber. If this layer is broken at some point and the loading coil case consists of metal, it is difficult to locate the defect because the cable sections are rigidly connected together through the metal cases. The present invention permits location of defects of the insulating cable sleeves with great facility. To this end, a readily detachable electrical connection is provided between the leaden cable sleeves of each case. In case of a defect, the connection is interrupted to permit instant location of the defect in either of the electrically separated cable parts.

In order that the invention may be readily carried into effect it will now be described in detail with reference to the accompanying drawing, in which:

Figs. 1 and 2 represent a receptacle of rectangular of the present invention;

Fig. 2 is a cross-section, taken at right angles to that of Fig. 1, of the case of Fig. 1;

Fig. 3 is a detail view, on a larger scale, of a portion of the case of Fig. 1 and illustrates the manner in which a cable is passed through the cover of the case; and Fig. 4 is a detail view of means for securing the coils to the case of the present invention.

Figs. 1 and 2 represent a receptacle of rectangular cross-section, the wall 1 of which consists of moulded material made from a mixture of an unsaturated polyester and a polymerisable compound (polyester resin). This plastic is reinforced with glass tissues or glass fibres.

The receptacle comprises a cover 2 made from the same material as the case. The cover 2 is not shown in cross-section. The cover 2 is dished to enhance its resistance against pressure. It comprises two diagonally arranged projecting parts or domes 3 and 4 through which the cables (not shown in Figs. 1 and 2) enter.

The cover 2 is secured to the edge of the receptacle 1 by means of ethoxyline resin, for example a type of resin available under the trade name "Araldite" (also termed epoxy resin).

With steel cases, there is a risk of the heat, which is evolved in welding the cover to the receptacle, damaging the coils or detracting from the magnetic properties of the ferromagneticum of the coils, which usually consists of ferrite. In securing the cover to a case of the present invention, no heat at all is evolved.

Metal lifting eyes, such as 5 and 6, may be secured by means of bolts (not shown) to the outside corners of the case.

As shown in Fig. 3, the inner diameter of the projecting part 3 considerably exceeds the diameter of the cable 7, thus leaving a space 8. The dish constituting the cover 2, when arranged upside down, is filled with ethoxyline resin 9 which also fills the space 8 between the wall of the dome and the cable. The resin prevents penetration of moisture through the holes for the passage of the cable, provided it firmly adheres to the cable. At the same time, the resin constitutes a considerable reinforcement of the cover.

The adherence between ethoxyline resin and a leaden cable covering is not always reliable, and therefore the cable is surrounded by a sleeve 10, which may be made of copper or brass. Although copper and brass do not always adhere satisfactorily with the resin, this is not objectionable if the sleeve is nickel- or chromium-plated externally. The resin satisfactorily adheres to a surface, particularly a dull surface, of nickel or chromium; that is, of metals which themselves firmly adhere to copper or brass. A satisfactory adherence of the resin is also achieved with silver or cadmium, but these metals suffer from a disadvantage in that their oxide films must first be carefully removed.

Circular grooves 11 of the sleeve 10 reduce the risk of the cable leaving the case under heavy pulling stress. The edges of the grooves 11 are rounded, lest cracks form in the hardened material. This means for anchoring metal rods in moulded insulating media are not novel as such, but, in accordance with the invention, the grooves are not provided in the rod (the cable 7, in the present instance) to be secured itself, but in the separate surrounding sleeve 10.

Besides excellent adherence to the cold-setting filling material the sleeve 10 has the advantage of preventing the cable from losing its shape as a result of bending stress exerted where the cable enters the dome. The sleeve 10 also contributes to preventing leaks. A flared outer end 12 of the sleeve 10 prevents damaging of the lead covering of the cable by the edge of said sleeve when said cable is bent. The sleeve 10 is internally soldered to the cable throughout its length. A ring 13 of soft solder is provided at the lower end between the lead covering of the cable and the sleeve 10. By these expedients, moisture is prevented from penetrating between the sleeve and the cable into the case. The lead-through arrangement of the cables in the aforesaid manner yields a very sturdy construction. Although the cable was subjected to a bending stress of such a degree that its covering cracked, the weld remained perfectly intact.

A metal or plastic strip 14 may be embedded in the moulded resin material 9. The strip 14 may have two lateral tags 15 and 16 each having two threaded ends 17 thereon. The threaded ends 17 protrude from the moulded resin material, so that a corner stay 18 may be secured to them. A plastic supporting plate 19 may be secured to the stay 18.

The supporting plates 19 are interconnected by means of a cross-wall 20, made of plastic, which is slipped into U-shaped fillets 21 and 22 secured to said supporting plates and to the bottom of the receptacle respectively. At both sides a number of clamping gutters 23 notched, channeled, or separated at 24 are provided on the wall 20.

Fig. 4 shows two of the gutters 23 with the direction of projection at right angles to the bottom of the receptacle. One of the gutters is shown in cross-section to illustrate the depth of the notch or channel. Each section of the gutters 23 constitutes a resilient clamp for a loading coil. The cable conductors are each connected to one end of one of the coils. In this respect the loading coil case in accordance with the invention is arranged similarly to known cases so that further explanation of the connections to be established and the construction of the coils themselves is superfluous. As a rule, the device is delivered completely mounted with several meters of cable.

From Fig. 2 it is seen that each gutter 23 is divided into eleven sections. In the example shown in the drawing, each side of the wall may comprise five gutters, so that the case accommodates 110 coils in all.

It is advisable for the gutters 23 to be made of reinforced polyester resin, at least from thermosetting plastic. The use of metal would increase the likelihood of interconnection of the conductors in the case of impaired isolation, while thermoplastic material is unsuitable for the manufacture of clamps on account of its plastic aftereffect. Should the surrounding space inside the vessel be filled with insulating material liquefied by heating, thermo-plastic material such as polyvinyl chloride is even less suitable for the clamps.

While the invention has been described by means of a specific example and in a specific embodiment, I do not wish to be limited thereto, for obvious modifications will occur to those skilled in the art without departing from the spirit and scope of the invention.

What is claimed is:

1. A loading coil case comprising a receptacle and a cover for said receptacle, each formed of a glass filled polyester resin, said cover containing at least one outwardly projecting portion through which a substantially flexible lead covered cable is passed, said projecting portion containing a rigid metal sleeve closely surrounding and soldered to said lead covered cable and separated from the inner wall of said projection by a solid insulating medium that firmly adheres both to the inner surface of the projection and to the metal sleeve, said sleeve extending out of said cover and having a flared outer end.

2. A loading coil case comprising a receptacle and a cover for said receptacle, each formed of a glass filled polyester resin, said cover containing at least one outwardly projecting portion through which a substantially flexible lead covered cable is passed, said projecting portion containing a rigid metal sleeve closely surrounding and soldered to said lead covered cable and separated from the inner wall of said projection by a mass of ethoxyline resin which firmly adheres both to the inner surface of the projection and to the metal sleeve, said sleeve extending out of said cover and having a flared outer end.

3. A loading coil case comprising a receptacle and a cover for said receptacle, each formed of a glass filled polyester resin, said cover containing at least one outwardly projecting portion through which a substantially flexible lead covered cable is passed, said projecting portion containing a rigid metal sleeve, the outer surface of which is plated with a metal selected from the group consisting of nickel and chromium, closely surrounding and soldered to said lead covered cable and separated from the inner wall of said projection by a mass of ethoxyline resin which firmly adheres both to the inner surface of the projection and to the metal sleeve, said sleeve extending out of said cover and having a flared outer end.

4. A loading coil case comprising a receptacle and a cover for said receptacle, each formed of a glass filled polyester resin, said cover containing at least one outwardly projecting portion through which a substantially flexible lead covered cable is passed, said projecting portion containing a rigid metal sleeve, the outer surface of which is plated with a metal selected from the group consisting of nickel and chromium, closely surrounding and soldered to said lead covered cable, and separated from the inner wall of said projection by a mass of ethoxyline resin which firmly adheres both to the inner surface of the projection and to the metal sleeve, said sleeve extending out of said cover and being provided with circular grooves having rounded edges and a flared outer end.

5. The loading coil case as claimed in claim 4, wherein said cover is dished with its concave side inwards and is filled with ethoxyline resin.

6. The loading coil case as claimed in claim 5, further comprising a loading coil and means for supporting various portions of said loading coil, said supporting means being embedded in the ethoxyline resin.

References Cited in the file of this patent

UNITED STATES PATENTS

| 1,130,483 | Davis | Mar. 2, 1915 |
| 2,079,697 | Ranges | May 11, 1937 |
| 2,197,193 | Pontis | Apr. 16, 1940 |
| 2,446,277 | Gordon | Aug. 3, 1948 |
| 2,574,000 | Victoreen | Nov. 6, 1951 |
| 2,713,700 | Fisher | July 26, 1955 |
| 2,816,947 | Leightner et al. | Dec. 17, 1957 |

FOREIGN PATENTS

| 13,760 | Netherlands | Nov. 16, 1925 |
| 890,076 | Germany | July 8, 1949 |

OTHER REFERENCES

Astron AD Serulle, May 1953, pages 50, 51 and 114.

"Casting Resins," Electronics, October 1956, pages 188–191.

British Plastics, December 1953, page 37, vol. 26, No. 295.